(12) United States Patent
Shahbazi et al.

(10) Patent No.: US 12,555,583 B2
(45) Date of Patent: Feb. 17, 2026

(54) DEVICE, SYSTEM, AND METHOD TO INITIATE A COMMUNICATION BETWEEN COMMUNICATION DEVICES BASED ON AUDIO INPUT

(71) Applicant: MOTOROLA SOLUTIONS, INC., Chicago, IL (US)

(72) Inventors: Behnam Shahbazi, Marina Del Rey, CA (US); Amir Khakpour, Los Angeles, CA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 203 days.

(21) Appl. No.: 18/227,076

(22) Filed: Jul. 27, 2023

(65) Prior Publication Data

US 2025/0037722 A1    Jan. 30, 2025

(51) Int. Cl.
*G06F 17/00* (2019.01)
*G06V 40/10* (2022.01)
(Continued)

(52) U.S. Cl.
CPC .............. *G10L 17/14* (2013.01); *G06V 40/10* (2022.01); *G06V 40/70* (2022.01); *G10L 17/02* (2013.01); *G10L 17/04* (2013.01); *G10L 17/10* (2013.01)

(58) Field of Classification Search
CPC ......... G10L 17/02; G10L 17/04; G10L 17/10; G10L 17/14; G10L 15/063; G10L 15/26; G06V 40/00; G06V 40/10; G06V 40/70
(Continued)

(56) References Cited

U.S. PATENT DOCUMENTS 8,805,340 B2   8/2014 Lau et al.
9,449,599 B2   9/2016 Printz
(Continued)

FOREIGN PATENT DOCUMENTS

WO   WO-2019118147 A1   6/2019

OTHER PUBLICATIONS

H4 Video Intercom_Avigilon—https://www.avigilon.com/security-cameras/h4-video-intercom; downloaded Jun. 20, 2023.
(Continued)

*Primary Examiner* — Paul C Mccord
(74) *Attorney, Agent, or Firm* — PERRY + CURRIER INC.

(57) ABSTRACT

A device, system and method to initiate a communication between communication devices based on audio input is provided. A computing device converts audio input from a first communication device into phonetic data corresponding to a target name from the audio input, and selects, using a machine learning algorithm, from names that potentially match the target name, a particular name as a match, using as input to the algorithm: the phonetic data; and non-phonetic data associated with one or more of the audio input, and at least one of the names. The computing device: initiates a communication between the first communication device, and a second communication device associated with the particular name; receives, from one or more of the first and second communication devices, feedback indicating whether the match of the particular name and the target name is positive or negative; and trains the machine learning algorithms using the feedback.

16 Claims, 6 Drawing Sheets

(51) Int. Cl.
*G06V 40/70* (2022.01)
*G10L 17/02* (2013.01)
*G10L 17/04* (2013.01)
*G10L 17/10* (2013.01)
*G10L 17/14* (2013.01)

(58) Field of Classification Search
USPC .......................................................... 704/235
See application file for complete search history.

(56) References Cited

U.S. PATENT DOCUMENTS

| | | |
|---|---|---|
| 9,721,563 B2 | 8/2017 | Naik |
| 10,706,843 B1 | 7/2020 | Elangovan et al. |
| 10,902,722 B2 | 1/2021 | Lin |
| 2015/0097689 A1 | 4/2015 | Logue et al. |
| 2016/0247110 A1* | 8/2016 | Sinha ............... G06Q 10/06316 |
| 2018/0293221 A1* | 10/2018 | Finkelstein ............ G06N 20/00 |

OTHER PUBLICATIONS

Openpath Video Reader Pro_Avigilon Alta Access—https://www.avigilon.com/access-control/video-reader-pro; downloaded Jun. 20, 2023.
PCT/US2024/037316, Device, System, and Method To Initiate a Communication Between Communication Devices Based On Audio Input, Jul. 10, 2024.

* cited by examiner

DEVICE, SYSTEM, AND METHOD TO INITIATE A COMMUNICATION BETWEEN COMMUNICATION DEVICES BASED ON AUDIO INPUT

BACKGROUND OF THE INVENTION

Initiating communications between communication devices based on audio input received at a first communication device may be challenging. In particular, the audio input may indicate a particular name, however the particular name may match, or partially match, a plurality of names associated with different second communication devices.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
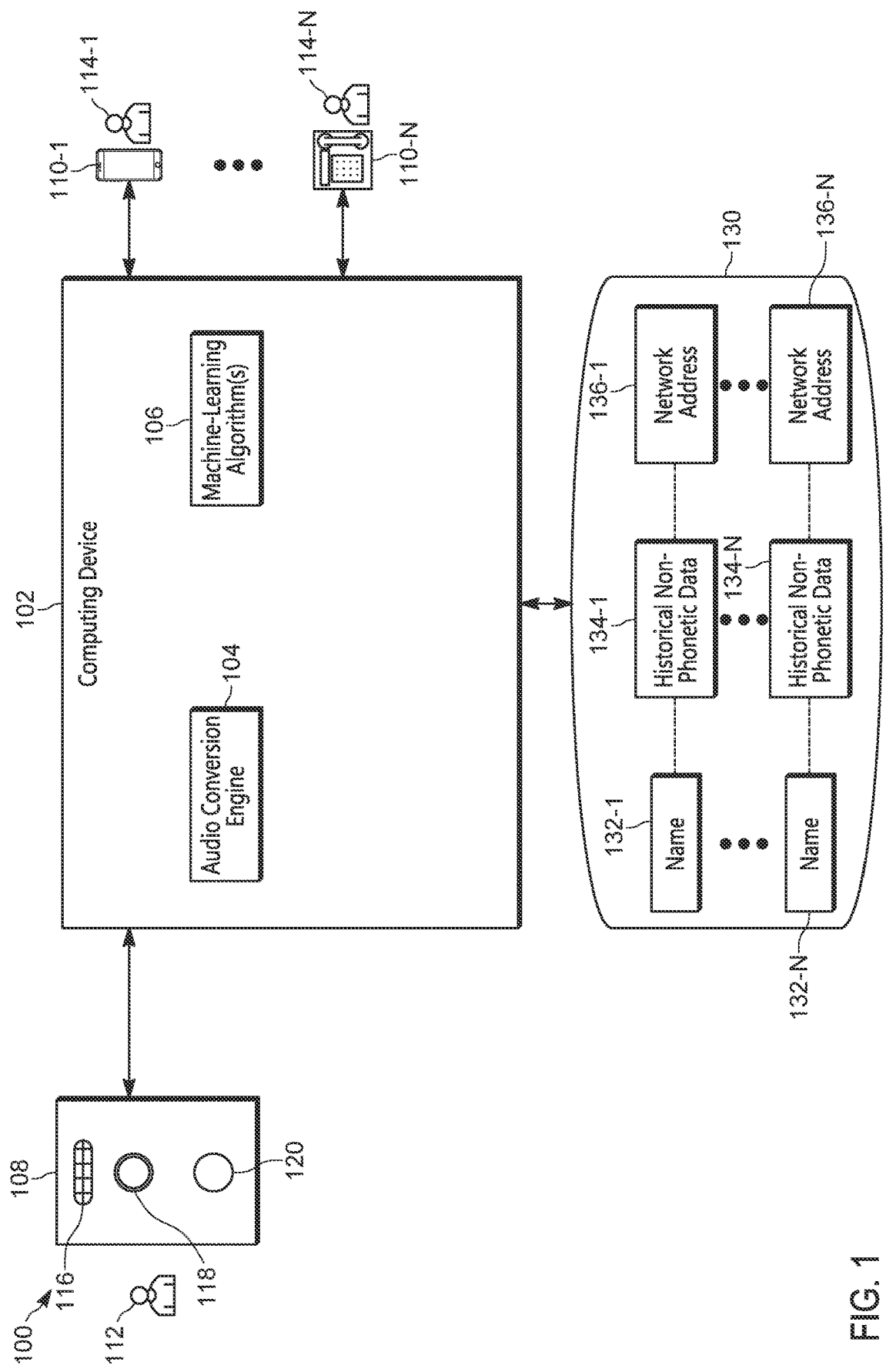
FIG. 1 is a system to initiate a communication between communication devices based on audio input, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Initiating communications between communication devices based on audio input received at a first communication device may be challenging. A system that selects an incorrect name and initiates a communication between the first communication device and a second communication device associated with the incorrect name may waste bandwidth between the communication devices: similarly, processing resources in the system may be wasted. Thus, there exists a need for an improved technical method, device, and system to initiate a communication between communication devices based on audio input.

Hence, provided herein is a device, system and method to initiate a communication between communication devices based on audio input. In particular, a computing device may be provided that converts audio input, from a first communication device, into phonetic data corresponding to a target name from the audio input. The first communication device may, in specific examples, comprise an intercom at a fixed location, and the computing device may comprise a server, and the like, in communication with the first communication device. The computing device may be generally configured to initiate a communication from the first communication device to a second communication device. Such a communication may comprise a call (e.g. a voice call), a message, a notification, and/or any other suitable communication.

For example, the computing device may have access to a database, and the like, storing a plurality of names that may potentially match the target name from the audio input, the plurality of names associated with respective second communication devices. The computing device generally uses one or more machine learning algorithms to select a particular name, from the plurality of names, as a match to the target name. In particular, the computing device generally uses, as input to the one or more machine learning algorithms, to select the particular name, the phonetic data corresponding to the target name from the audio input. However, the computing device generally further uses, as further input to the one or more machine learning algorithms to select the particular name, non-phonetic data associated with one or more of the audio input, and at least one of the plurality of names.

Hence, the input to the one or more machine learning algorithms may generally include: the phonetic data corresponding to the target name from the audio input; and the non-phonetic data associated with one or more of the audio input, and at least one of the plurality of names.

The non-phonetic data may include, but is not limited to: an image of a caller that originated the audio input as acquired in association with receiving the audio input from the first communication device for comparison with historical image data associated with the particular name, the historical image data corresponding to the image.

Alternatively, and/or in addition, the non-phonetic data may include, but is not limited to: an audio signature of the caller that originated the audio input as determined in association with receiving the audio input from the first communication device for comparison with historical audio data associated with the particular name, the historical audio data corresponding to the audio signature.

Alternatively, and/or in addition, the non-phonetic data may include, but is not limited to: location data associated with the first communication device for comparison with respective location data associated with the plurality of names (e.g., such as a location of an office and/or a building); and/or role data received with the audio input, for comparison with respective role data associated with the plurality of names (e.g., such as an associated department and/or hierarchical title, and the like).

In general, the non-phonetic data may comprise any suitable non-phonetic data, which may enable the one or more machine learning algorithms to determine which of the plurality of names to select as a match to the target name.

The computing device further generally initiates a communication between the first communication device, and a second communication device associated with the particular name. A network address, for example, of the second communication device may be stored in association with the particular name at the database. Hence, the computing device may generally initiate a communication between the first communication device, and the second communication device using such a network address (e.g., such as a phone number, an email address, an extension in an intercom system, and the like). The communication between the first communication device and the second communication device may comprise any suitable communication including, but not limited to, a call, a message, a notification, and the like.

However, it is understood that the particular name selected by the one or more machine learning algorithms may generally be a best guess made by the one or more machine learning algorithms, which may or may not be a correct guess.

As such, the computing device may receive feedback from one or more of the first communication device and the second communication device, the feedback indicating whether the match of the particular name and the target name is positive or negative. For example, in conjunction with initiating the communication, and/or after initiating the communication, the computing device may request such feedback from one or more of the first communication device and the second communication device.

In a particular example, an operator of the second communication device (e.g., a callee having the particular name) may operate the second communication device to indicate whether they were the correct recipient of the communication. Alternatively and/or in addition, an operator of the first communication device (e.g., a caller who initiated the audio input) may operate the first communication device to indicate whether the operator of the second communication device was the correct recipient of the communication. The feedback may be binary, and may indicate that "YES" the match of the particular name and the target name was positive, or "NO" "the match of the particular name and the target name was negative, however the feedback may be in any suitable format (e.g., "1" for positive and "0" for negative", and the like). Indeed, such a binary feedback may correct a score output from the one or more machine learning algorithms with the particular name (e.g., as a machine learning algorithm generally outputs a score between 0 and 1 with output, indicating the machine learning algorithms own estimation as to accuracy of the output).

The feedback may be used to train the one or more machine learning algorithms using the feedback, for example to better select a particular name as a match to a target name at a later instance of receiving phonetic and non-phonetic data as input.

In this manner, communications may be later initiated more efficiently and/or with more accuracy using audio input, thereby using processing resources more efficiently and/or reducing a chance of wasting bandwidth when incorrect names are selected.

An aspect of the present specification provides a method comprising: converting, via a computing device, audio input from a first communication device, into phonetic data corresponding to a target name from the audio input: selecting, via the computing device, using one or more machine learning algorithms, from a plurality of names that potentially match the target name, a particular name as a match to the target name, using as input to the one or more machine learning algorithms: the phonetic data; and non-phonetic data associated with one or more of the audio input, and at least one of the plurality of names: initiating, via the computing device, a communication between the first communication device, and a second communication device associated with the particular name: receiving, via the computing device, from one or more of the first communication device and the second communication device, feedback indicating whether the match of the particular name and the target name is positive or negative; and training, via the computing device, the one or more machine learning algorithms using the feedback.

Another aspect of the present specification provides a computing device comprising: a controller; and a computer-readable storage medium having stored thereon program instructions that, when executed by the controller, cause the computing device to perform a set of operations comprising: converting audio input from a first communication device, into phonetic data corresponding to a target name from the audio input: selecting, using one or more machine learning algorithms, from a plurality of names that potentially match the target name, a particular name as a match to the target name, using as input to the one or more machine learning algorithms: the phonetic data; and non-phonetic data associated with one or more of the audio input, and at least one of the plurality of names: initiating a communication between the first communication device, and a second communication device associated with the particular name: receiving, from one or more of the first communication device and the second communication device, feedback indicating whether the match of the particular name and the target name is positive or negative; and training the one or more machine learning algorithms using the feedback.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus that may be on or off-premises, or may be accessed via cloud in any of a software as a service (Saas), platform as a service (PaaS), or infrastructure as a service (IaaS) architecture so as to cause a series of operational blocks to be performed on the computer or other programmable apparatus to produce a computer implemented process such that the instructions, which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Herein, the term "engine" is understood to refer to hardware, and/or a combination of hardware and software (e.g., a combination of hardware and software includes software hosted at hardware, such as a software module that is stored at a processor-readable memory implemented or interpreted by a processor), or hardware and software hosted at hardware and/or implemented as a system-on-chip architecture and the like.

Further advantages and features consistent with this disclosure will be set forth in the following detailed description, with reference to the drawings.

Attention is directed to FIG. 1, which depicts an example system 100 to initiate a communication between communication devices based on audio input. The various components of the system 100 are in communication via any suitable combination of wired and/or wireless communication links, and communication links between components of the system 100 are depicted in FIG. 1, and throughout the present specification, as double-ended arrows between respective components: the communication links may include any suitable combination of wireless and/or wired links and/or wireless and/or wired communication networks, and the like.

The system 100 comprises a computing device 102, implementing an audio conversion engine 104 and one or more machine learning algorithms 106.

For simplicity, the one or more machine learning algorithms 106 is interchangeably referred to hereafter as a machine learning algorithm 106. While not depicted, the machine learning algorithm 106 may implemented in the form of an engine (e.g., a machine learning engine), and the like.

The system 100 further comprises a first communication device 108 and a plurality of second communication devices 110-1 . . . 110-N. As depicted, the first communication device 108 may be operated by a caller 112 to call a one of the plurality of second communication devices 110-1 . . . 110-N operated by respective callees 114-1 . . . 114-N.

For simplicity, the plurality of second communication devices 110-1 . . . 110-N are interchangeably referred to hereafter, collectively, as the second communication devices 110 and, generically, as a second communication device 110. This convention will be used elsewhere in the present specification. For example, the callees 114-1 . . . 114-N are interchangeably referred to hereafter, collectively, as the callees 114 and, generically, as a callee 114.

Furthermore, a number "N" of the second communication devices 110 and respective callees 114 are depicted, and "N" may be at least two such that the system 100 comprises at least two second communication devices 110 and respective callees 114, though the system 100 may comprise tens to hundreds of second communication devices 110 and respective callees 114, or more. However, any suitable number of second communication devices 110 and respective callees 114 is within the scope of the present specification.

The computing device 102 is generally in communication with the first communication device 108 and the second communication devices 110 and may initiate communications between the first communication device 108 and a second communication device 110 as described herein. Such communications between the first communication device 108 and a second communication device 110 may comprise calls (e.g. voice calls), messages (e.g. text messages, multimedia messaging service (MMS) messages, and the like), notifications (e.g. between applications operated by both the first communication device 108 and a second communication device 110), and the like, amongst other possibilities. As such, the terms "caller" and "callee" are understood not to be particularly limited to users who participate in a call, but rather the terms "caller" and "callee" are understood to include anyone who participates in any suitable type of communication.

In particular, and as depicted, the first communication device 108 may comprise an intercom at a fixed location, such as an entrance to a building, and the like, which may be operated by the caller 112, to attempt to communication a second communication device 110 to reach a respective callee 114.

In these examples, the second communication devices 110 may comprise communication devices to which the intercom of the first communication device 108 may be communicatively connected via communications therebetween, as described herein.

Similarly, the computing device 102 may be a component of an intercom communication system for a building, a company, and the like, operated, for example, by an entity such as a business, and the like, with which the callees 114 may be associated: for example, the callees 114 may be employees of such an entity. Alternatively, and/or in addition, the computing device 102 may be a component of an intercom communication system for a building and/or buildings, and the like, occupied by the callees 114 (e.g., including, but not limited to, commercial buildings, residential buildings, and the like). Regardless, such an entity may generally operate the system 100.

However, the second communication devices 110 may be in any suitable respective locations, and not only at a building where the first communication device 108 and/or intercom may be located. Indeed, in some examples, a portion of the second communication devices 110 may be located in the same building where the first communication device 108 and/or intercom is located, while another portion of the second communication devices 110 may be located in a different building, a different neighborhood, a different state, and/or a different country, and the like, including but not limited to, some portion of the second communication devices 110 being mobile and carried by respective callees 114.

The first communication device 108 may comprise any suitable communication device and/or may be in any suitable format that at least includes a microphone 116, and the like, for receiving audio input. It is further understood that the first communication device 108 also comprises a speaker. For example, the microphone 116 may comprise a speaker/microphone combination. Alternatively, a speaker may be provided separately from the microphone 116.

As depicted, the first communication device 108 comprises a video camera 118 and a button 120, which, upon actuation, may place the first communication device 108 into a mode for receiving audio input. However, the video camera 118 and/or the button 120 may be optional. When the button 120 is not present, the first communication device 108 may be in a listening mode to receive audio input at any suitable time.

While not depicted, the first communication device 108 may further comprise a display screen, which may include a touch screen, and/or an input component to receive feedback from the caller 112, such as a keypad and/or buttons, and the like, as described herein. In some examples, the microphone 116 may comprise such an input component.

As depicted, the second communication devices 110 may be in the form of cell phones, desk phones, and the like, however the second communication devices 110 may be in any suitable format that enables a communication to be occur between the first communication device 108 and a second communication device 110 including, but not limited to, an intercom, a personal computer enabled with communication functionality, a laptop enabled with communication functionality, and the like.

While not depicted, the second communication devices 110 may further comprise a display screen, which may include a touch screen, and/or an input component to receive feedback from a respective callee 114, such as a microphone, a keypad and/or buttons, and the like.

As depicted, the computing device 102 has access to a memory 130, for example provided in the form of a database, which stores a plurality of names 132-1 . . . 132-N (e.g., names 132 and/or a name 132), associated with respective historical non-phonetic data 134-1 . . . 134-N (e.g., historical non-phonetic data 134 and/or a set of historical non-phonetic data 134), and respective network addresses 136-1 . . . 136-N (e.g., network addresses 136 and/or a network address 136). Associations between a name 132, a respective set of historical non-phonetic data 134, and a respective network address 136 are illustrated in the present specification via dashed lines therebetween.

While a particular format and structure of a name 132, a respective set of historical non-phonetic data 134, and a respective network address 136 is depicted, data in the memory 130 may be stored in any suitable format and/or structure, including, but not limited to, a database format.

It is further understood that the names 132 are associated with respective callees 114, for example on a one-to-one basis, such that a given name 132 may comprise the name of a given callee 114, with a respective network address 136 comprising the network address of the second communication device 110 of the given callee 114. Hence, for example, a given name 132 may comprise "Portia Cline", which may respectively be the given and family names of a given callee 114, and the respective network address 136 may comprise the phone number, and the like, of the second communication device 110 operated by "Portia Cline".

Furthermore, a respective set of historical non-phonetic data 134 associated with a given name 132 and a given callee 114 may include, but is not limited to:

Images of previous callers that communicated with the given callee 114 (e.g., from the first communication device 108 to a second communication device 110 associated with the given callee 114). For example, such images may have been acquired by the video camera 118, and stored at the memory 130 by the computing device 102 at time of a previous caller calling the given callee 114.

Audio signatures of previous callers that communicated with the given callee 114 (e.g., from the first communication device 108 to a second communication device 110 associated with the given callee 114). For example, such audio signatures may have been acquired from audio input acquired by the microphone 116, for example when a caller speaks into the microphone 116, and stored at the memory 130 by the computing device 102 by the computing device 102 at time of the a previous caller calling the given callee 114. Such audio signatures may comprise frequencies present in the audio input, and relative intensities thereof, as generated by the computing device 102 from the voice data. In these examples, the computing device 102 may operate a frequency analyzer, and the like, to generate such audio signatures.

Location data associated with the first communication device 108. For example, such location data may comprise a building identifier, an office identifier, an address, a neighborhood, a city, a state and/or a country associated a location of the first communication device 108.

Respective role data received with the audio input. For example, such role data may comprise an associated department and/or hierarchical title of a callee 114 within an entity that operates the system 100.

Returning to the computing device 102 and the first communication device 108, the caller 112 may approach the first communication device 108, and operate the first communication device 108 (e.g., using the button 120) to speak a target name into the microphone 116, for example a name of a callee 114 with which the caller 112 wishes to communicate. The computing device 102 may receive such audio input from the first communication device 108 and/or the microphone 116, and convert the audio input into phonetic data using the audio conversion engine 104.

For example, a spoken target name of "Portia Cline" may be converted a textual representation of the target name, such as "PRXKLN" representing consonant sounds of the spoke name "Portia Cline": in this example "PR" may indicate "Por" of "Portia", "X" may indicate "tia" of "Portia" (which generally sounds like "SH", with "X" representing the "SH" sound), "KL" may indicate "Cl" of "Cline", and "N" may indicate "n" of "Cline" (with "e" being silent). Put another way, the computing device 102 may not identify a spelling of a spoken name, but may recognize sounds of the spoken name, and convert such sounds to a phonetic and/or textual representation of the spoken name using the audio conversion engine 104. While such phonetic data may represent consonants sounds of a target name, the phonetic data may represent any suitable sounds of the target name in any suitable manner.

In general, the phonetic data may be input to the machine learning algorithm 106, which may compare the phonetic data with the names 132 in the memory 130.

However, such phonetic data may match more than one name 132. For example, while one name 132 may comprise "Portia Cline" another name 132 may comprise "Porsha Klyne", which may be indicated by a same set of sounds and/or phonetic data (e.g., "PRXKLN") as "Portia Cline" (e.g., "Porsha Klyne" and "Portia Cline" sound the same when spoken).

As such, the machine learning algorithm 106 is further configured, to receive as input, both the phonetic data and non-phonetic data, which may be used to better select, from the plurality of names 132, a particular name as a match to the target name. For example, the caller 112 may have previously communicated with a particular callee 114 using the first communication device 108, and an image of the caller 112, and/or an audio signature of the caller 112, may be stored in the historical non-phonetic data 134. Hence, the machine learning algorithm 106 may receive an image and/or audio signature of the caller 112 (e.g., respectively via the video camera 118 and the microphone 116) in conjunction with caller 112 speaking the target name, and compare the image and/or audio signature of the caller 112 with historical non-phonetic data 134 of names 132 that match the phonetic data. When a match is found between a present image and/or audio signature, and an historical image and/or an historical audio signature associated with a particular name 132, that name 132 may be selected as a match to the target name. An underlying assumption in such an example is that if the caller 112 previously communicated with a given callee 114 having a particular name 132, using the first communication device 108, there is a high likelihood that when the caller 112 again speaks a target name into the first communication device 108 that has phonetic data that matches the particular name 132, but also other names 132, the caller 112 will again be attempting to communicate with the same given callee 114 with which communication previously occurred.

It is understood that the machine learning algorithm 106 may attempt to match more than one of the plurality of names 132 to the target name and assign a score to each match. Such a score may be between "0" and "1" indicating the accuracy, and the like, of a match, with "0" indicating no match and/or lowest accuracy, and "1" indicating a perfect match, and/or highest accuracy. In such examples, the machine learning algorithm 106 (and/or computing device 102) may select the name 132 with the highest score as the particular name 132.

Once the particular name 132 is selected, the computing device 102 initiates a communication between the first communication device 108 and the second communication device 110 having the network address 136 associated with the particular name 132. Such a communication may include, but is not limited to, a call between the first communication device 108 and the second communication device 110, a message provided from the first communication device 108 to the second communication device 110, a notification provided from the first communication device 108 to the second communication device 110, and the like.

However, it is understood that that the particular name 132 selected still represents a best guess by the machine learning algorithm 106 of a match to the target name. As such, the computing device 102 may receive feedback from one or more of the first communication device 108 and the second communication device 110 indicating whether the match of the particular name 132 and the target name is positive or negative. For example, in conjunction with initiating the communication between indicating whether the match of the particular name and the target name is positive or negative, the computing device 102 may cause one or more of the first communication device 108 and the second communication device 110 to solicit a respective response from the caller 112, and/or the callee 114, as to whether the callee 114 was the "correct" callee 114 with which the caller 112 was attempting to communicate.

For example, such feedback may be acquired via the caller 112 and/or the callee 114 being provided with a question, for example via a respective speaker and/or a respective display screen of a respective communication device 108, 110, and the caller 112 and/or the callee 114 may interact with a respective input component of a respective communication device 108, 110 to provide such feedback. For example, a question such as "Did you reach the right person", or "Was this caller trying to reach you", may be provided, and a binary answer, such as "YES" or "NO" may be received in response, which may be a spoken response when received via a microphone input component, or a data input when received via a touch screen or a keypad, and the like. For example, when the particular name 132 was correctly selected, the feedback may be "YES" (or any suitable equivalent such as "1"), or when the particular name 132 was incorrectly selected, the feedback may be "NO" (or any suitable equivalent such as "0").

Indeed, such feedback may comprise a correction to the aforementioned score output by the machine learning algorithm 106 when selecting the particular name 132.

Hence, for example, when the particular name 132 has a high score and/or a score indicating that the particular name 132 selected is the best match to the target name (e.g., a score between 0.5 and 1 that may be higher than scores of other matches to the target name), but the feedback is "NO" or "0", the score may be corrected to "0". In this example, the feedback may indicate that the machine learning algorithm 106 needs better training to predict matches to target names.

Similarly, when the particular name 132 has a score indicating that the particular name 132 selected is the best match to the target name but the score is still poor (e.g., a score between 0.5 and 0.7, but which may still be higher than scores of other matches to the target name), but the feedback is "YES" or "1", the score may be corrected to "1" and/or towards "1" (e.g. less than "1" but greater than "0.9", and or greater than any suitable value that indicates positive training data). In this example, the feedback may again indicate that the machine learning algorithm 106 needs better training to predict matches to target names even if the particular name 132 that was selected was correct.

Such feedback may then be used to label the input (e.g., the phonetic data and non-phonetic data) and output (e.g., the particular name) of the machine learning algorithm 106, which may be assembled a labelled training data. The machine learning algorithm 106 may be placed in a training mode and/or learning mode, such that labelled training data may be used to train the machine learning algorithm 106 to better select particular names when audio input is later received at the first communication device 108.

It is further understood that as the machine learning algorithm 106 continues to be trained, scores output by the machine learning algorithm 106 when selecting a particular name 132 may increase, and may, for example, increase over time towards "1".

It is further understood that the system 100 may comprise more than one first communication device 108 (e.g., and/or intercom), and that the historical non-phonetic data 134 stored at the memory 130 may be particular to each first communication device 108. For example, while the names 132 and network addresses 136 may still be one-to-one with the second communication devices 110, a name 132 may be stored with respective historical non-phonetic data 134 associated with particular first communication devices 108. For example, different images and/or audio signatures of callers may be stored that were acquired at particular first communication devices 108, such that when audio input is received from a particular first communication device 108, a particular name 132 is selected using the historical non-phonetic data 134 associated with the particular first communication device 108 from which the audio input is received.

Figure 2:
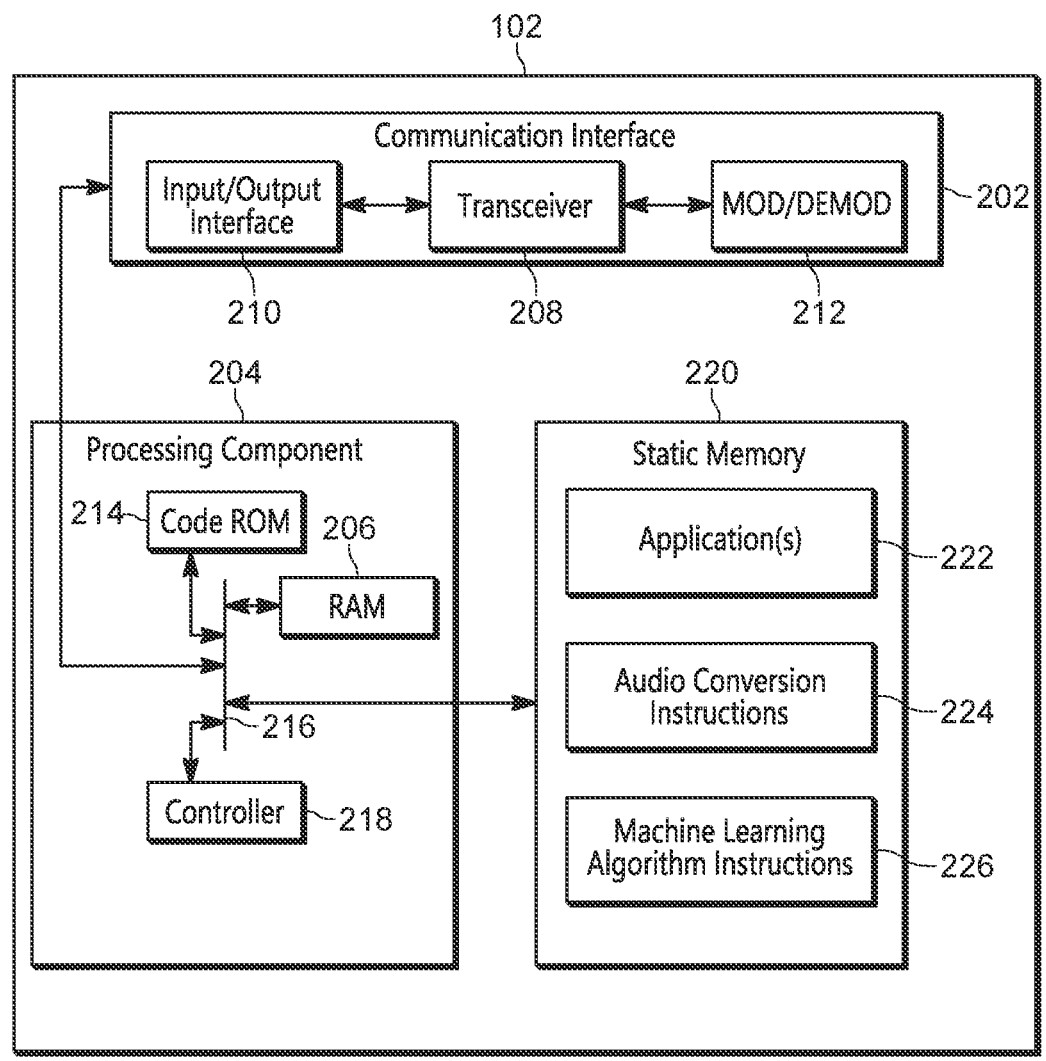
FIG. 2 is a device diagram showing a device structure of a computing device to initiate a communication between communication devices based on audio input, in accordance with some examples.

Attention is next directed to FIG. 2, which depicts a schematic block diagram of an example of the computing device 102. While the computing device 102 is depicted in FIG. 2 as a single component, functionality of the computing device 102 may be distributed among a plurality of components and the like including, but not limited to, any suitable combination of one or more servers, one or more cloud computing devices, one or more proxy devices, and the like.

As depicted, the computing device 102 comprises: a communication interface 202, a processing unit 204, a Random-Access Memory (RAM) 206, one or more wireless transceivers 208 (e.g., which may be optional), one or more wired and/or wireless input/output (I/O) interfaces 210, a combined modulator/demodulator 212, a code Read Only Memory (ROM) 214, a common data and address bus 216, a controller 218, and a static memory 220 storing at least one application 222. Hereafter, the at least one application 222 will be interchangeably referred to as the application 222. Furthermore, while the memories 206, 214 are depicted as having a particular structure and/or configuration, (e.g., separate RAM 206 and ROM 214), memory of the computing device 102 may have any suitable structure and/or configuration. Furthermore, a portion of the memory 220 may comprise the memory 130.

While not depicted, the computing device 102 may include, and/or be in communication with, one or more of an input component and a display screen (and/or any other suitable notification device) and the like.

As shown in FIG. 2, the computing device 102 includes the communication interface 202 communicatively coupled to the common data and address bus 216 of the processing unit 204.

The processing unit 204 may include the code Read Only Memory (ROM) 214 coupled to the common data and address bus 216 for storing data for initializing system components. The processing unit 204 may further include the controller 218 coupled, by the common data and address bus 216, to the Random-Access Memory 206 and the static memory 220.

The communication interface 202 may include one or more wired and/or wireless input/output (I/O) interfaces 210 that are configurable to communicate with other components of the system 100. For example, the communication interface 202 may include one or more wired and/or wireless transceivers 208 for communicating with other suitable components of the system 100. Hence, the one or more transceivers 208 may be adapted for communication with one or more communication links and/or communication networks used to communicate with the other components of the system 100. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) and/or 3GPP ($3^{rd}$ Generation Partnership Project) networks, a 5G network (e.g., a network architecture compliant with, for example, the 3GPP TS 23 specification series and/or a new radio (NR) air interface compliant with the 3GPP TS 38 specification series) standard), a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a 3GPP transceiver, an LTE transceiver, a GSM transceiver, a 5G transceiver, a Bluetooth transceiver, a Wi-Fi transceiver, a WiMAX transceiver, and/or another similar type of wireless transceiver configurable to communicate via a wireless radio network.

It is understood that while DMR transceivers, P25 transceivers, and TETRA transceivers may be particular to first responders, in some examples, the system 100 may be operated by a first responder entity (e.g., such as a police department, a fire department, an emergency medical services department, and the like), and hence such transceivers may be used for communications between the first communication device 108 and second communication devices 110 operated by first responders (e.g., the callees 114 may comprise first responders, such as police officers, fire fighters, emergency medical technicians, and the like).

The communication interface 202 may further include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 may also be coupled to a combined modulator/demodulator 212.

The controller 218 may include ports (e.g., hardware ports) for coupling to other suitable hardware components of the system 100.

The controller 218 may include one or more logic circuits, one or more processors, one or more microprocessors, one or more GPUs (Graphics Processing Units), and/or the controller 218 may include one or more ASIC (application-specific integrated circuits) and one or more FPGA (field-programmable gate arrays), and/or another electronic device. In some examples, the controller 218 and/or the computing device 102 is not a generic controller and/or a generic device, but a device specifically configured to implement functionality to initiate a communication between communication devices based on audio input. For example, in some examples, the computing device 102 and/or the controller 218 specifically comprises a computer executable engine configured to implement functionality to initiate a communication between communication devices based on audio input.

The static memory 220 comprises a non-transitory machine readable medium that stores machine readable instructions to implement one or more programs or applications. Example machine readable media include a non-volatile storage unit (e.g., Erasable Electronic Programmable Read Only Memory ("EEPROM"), Flash Memory) and/or a volatile storage unit (e.g., random-access memory ("RAM")). In the example of FIG. 2, programming instructions (e.g., machine readable instructions) that implement the functionality of the computing device 102 as described herein are maintained, persistently, at the memory 220 and used by the controller 218, which makes appropriate utilization of volatile storage during the execution of such programming instructions.

As depicted, the memory 220 further stores audio conversion programming instructions 224 that, when executed by the controller 218, enables the controller 218 to implement the audio conversion engine 104.

As depicted, the memory 220 further stores machine learning algorithm programming instructions 226 that, when executed by the controller 218, enables the controller 218 to implement the one or more machine learning algorithms 106.

While not depicted, the memory 220 may further store programming instructions for implementing a frequency analyzer, and the like, for generating audio signatures. It is understood that programming instructions for such a frequency analyzer may be a component and/or module of the application 222.

While not depicted, the memory 220 may further store programming instructions for implementing a labelling machine learning algorithm, and the like, for labelling training data when feedback described herein is not received. It is understood that programming instructions for such a labelling machine learning algorithm may be a component and/or module of the application 222 and/or may comprise one of the machine learning algorithms 106.

While the one or more sets of programming instructions 224, 226 are depicted as separate from the at least one application 222, one or more of the sets of programming instructions 224, 226 (or any other suitable programming instructions) may be a component and/or a module of the application 222.

Figure 3:
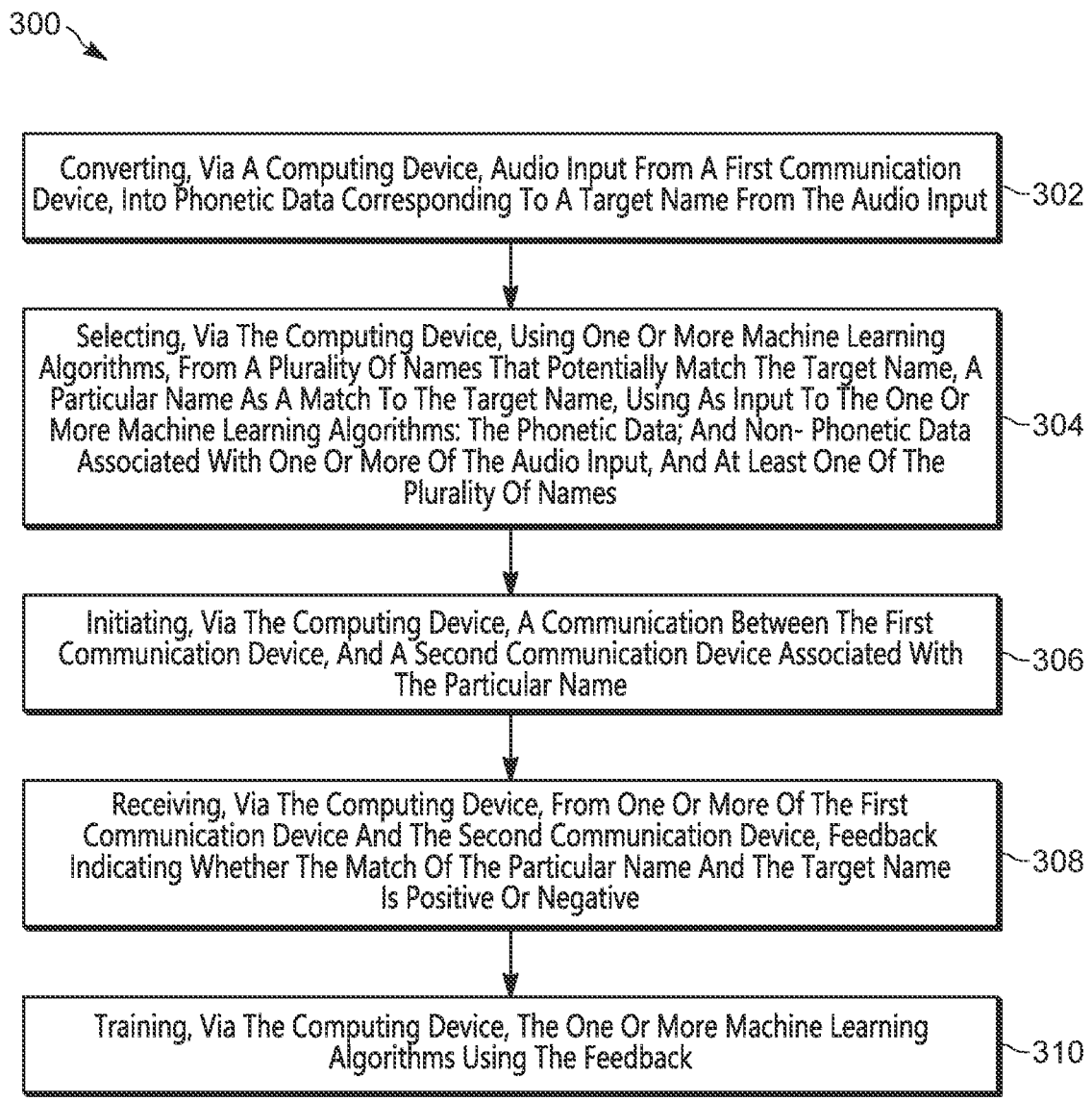
FIG. 3 is a flowchart of a method to initiate a communication between communication devices based on audio input, in accordance with some examples.

Regardless, it is understood that the memory 220 stores instructions corresponding to the at least one application 222 (and/or the programming instructions 224) that, when executed by the controller 218, enables the controller 218 to implement functionality to initiate a communication between communication devices based on audio input, including, but not limited to, the blocks of the method set forth in FIG. 3. In particular, the computing device 102 is understood to comprise: the controller 218; and a computer-readable storage medium (e.g. the memory 220) having stored thereon program instructions (e.g. the at least one application 222 and/or the programming instructions 224) that, when executed by the controller 218, causes the computing device 102 to perform a set of operations comprising the blocks of the method set forth in FIG. 3.

The application 222 and/or the programming instructions 224 may include programmatic algorithms, and the like, to implement functionality as described herein.

Alternatively, and/or in addition, the application 222 and/or the programming instructions 224 may include one or more machine learning algorithms. For example, the audio input may be converted to phonetic data using one or more machine learning algorithms and/or a programmatic algorithm. However, the programming instructions 226 may comprise and/or define the one or more machine learning algorithms 106.

Indeed, the machine learning algorithms 106 (as well as any other machine learning algorithms of the application 222 and/or the programming instructions 224) may include, but are not limited to: a deep-learning based algorithm: a neural network: a generalized linear regression algorithm: a random forest algorithm: a support vector machine algorithm: a gradient boosting regression algorithm: a decision tree algorithm: a generalized additive model: evolutionary programming algorithms: Bayesian inference algorithms, reinforcement learning algorithms, and the like. However, any suitable machine learning algorithm and/or deep learning algorithm and/or neural network is within the scope of present examples.

While details of the communication devices 108, 110, are not depicted, the communication devices 108, 110 may have components similar to the computing device 102 adapted, however, for the functionality thereof.

Attention is now directed to FIG. 3, which depicts a flowchart representative of a method 300 to initiate a communication between communication devices based on audio input. The operations of the method 300 of FIG. 3 correspond to machine readable instructions that are executed by the computing device 102, and specifically the controller 218 of the computing device 102. In the illustrated example, the instructions represented by the blocks of FIG. 3 are stored at the memory 220 for example, as the application 222 and/or the instructions 224, 226. The method 300 of FIG. 3 is one way that the controller 218 and/or the computing device 102 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 218, and/or the computing device 102, converts audio input from a first communication device 108, into phonetic data corresponding to a target name from the audio input.

As has already been described, the conversion of the audio input into phonetic input may occur using the audio conversion engine 104. For example, for a target name of "Portia Cline" received in audio input from the first communication device 108, may be converted to phonetic data of "PRXKLN".

However, the phonetic data may comprise any suitable phonetic and/or textual representation of the target name.

At a block 304, the controller 218, and/or the computing device 102, selects, using one or more machine learning algorithms 106, from a plurality of names 132 that potentially match the target name, a particular name 132 as a match to the target name, using as input to the one or more machine learning algorithms 106: the phonetic data; and non-phonetic data associated with one or more of the audio input, and at least one of the plurality of names 132.

The phonetic data input to one or more machine learning algorithms 106 may comprise the output of the audio conversion engine 104 as previously described.

It is understood that the names 132 and the historical non-phonetic data 134 may also be used as input to the one or more machine learning algorithms 106 for comparison against, respectively the phonetic data and the non-phonetic data. Hence, the non-phonetic data used as input to the one or more machine learning algorithms 106 may include the names 132, the historical non-phonetic data 134, and non-phonetic data associated with the audio input. Such and non-phonetic data associated with the audio input is next described.

The non-phonetic data may comprise an image of the caller 112 that originated the audio input as acquired in association with receiving the audio input from the first communication device 108, the image for comparison with historical image data (e.g., stored in historical non-phonetic data 134) associated with the particular name 132, the historical image data corresponding to the image. For example, the image of the caller 112 may be acquired by the video camera 118.

Hence, for example, the machine learning algorithm 106 may compare an image of the caller 112 received from the video camera 118 with historical images stored in historical non-phonetic data 134 to determine a match. Hence, when the phonetic data matches two or more names 132, an image of the caller 112 may be used to determine whether the caller 112 previously communicated with a second communication device 110 (e.g. using the first communication device 108) associated with one of the two or more names 132. When an image of the caller 112 matches historical image data associated with one name 132 of the two or more names 132, that name 132 may be selected as the particular name 132 at the block 304.

Alternatively, and/or in addition, the non-phonetic data may comprise an audio signature of the caller 112 that originated the audio input as determined in association with receiving the audio input from the first communication device 108, the audio signature for comparison with historical audio data (e.g., stored in historical non-phonetic data 134) associated with the particular name 132, the historical audio data corresponding to the audio signature. Hence, for example, the machine learning algorithm 106 may convert the audio input to an audio signature using a frequency analyzer, and compare the audio signature of the caller 112 received from the microphone 116 with historical audio signatures stored in historical non-phonetic data 134 to determine a match. Alternatively, and/or in addition, the first communication device 108 may generate an audio signature from audio input received at the microphone 116 and provide the audio signature to the computing device 102; in such examples, the first communication device 108 may comprise a frequency analyzer, and the like.

Regardless of how an audio signature is determined, the machine learning algorithm 106 may compare an audio signature of the caller 112 with historical audio signatures stored in historical non-phonetic data 134 to determine a match. Hence, when the phonetic data matches two or more names 132, an audio signature of the caller 112 may be used to determine whether the caller 112 previously communicated with a second communication device 110 (e.g. using the first communication device 108) associated with one of the two or more names 132. When an audio signature of the caller 112 matches an historical audio signature associated with one name 132 of the two or more names 132, that name 132 may be selected as the particular name 132 at the block 304.

Alternatively, and/or in addition, the non-phonetic data may comprise location data associated with the first communication device 108 for comparison with respective location data associated with the plurality of names 132. For example, the phonetic data may match two or more names 132 or more of the names 132, but only one of the names 132 may be associated with a location where the first communication device 108 is also located. Hence, when location data associated with the first communication device 108 is the same, or similar to (e.g., a same building and/or address) a respective location data associated with one name 132 of the plurality of names 132, that name 132 may be selected as the particular name 132 at the block 304.

Alternatively, and/or in addition, the non-phonetic data may comprise role data received with the audio input, for comparison with respective role data associated with the plurality of names 132. In these examples, the caller 112 may provide, in audio input, both a target name, and a department name and/or a role of a callee 114 with whom the caller 112 wishes to communicate (e.g., the caller 112 may say "I want to communicate with Portia Cline in software development" or "I want to communicate with Portia Cline who is a programmer", and the like).

Alternatively, and/or in addition, the controller 218 and/or the computing device 102 may control a speaker (or any other suitable output component) of the first communication device 108 to inquire as to a role of a callee 114 with whom the caller 112 wishes to communicate. For example, the caller 112 may initially say into the microphone 116 "I want to communicate with Portia Cline" and the computing device 102 may control the first communication device 108 to provide an inquiry such as "What is her department?" and/or "What is her title?", and the like, and the caller 112 may reply with "Software Development" and/or "A programmer", and the like.

Alternatively, and/or in addition, such role data may be solicited by the first communication device 108 automatically, for example when the audio input is received (and does not include role data).

In these examples, the phonetic data may match two or more names 132 or more of the names 132, but only one of the names 132 may be associated with role data that matches role data received with the audio input. Hence, when role data received with the audio input is the same, or similar respective role data associated with one name 132, of the plurality of names 132, that name 132 may be selected as the particular name 132 at the block 304.

It is hence understood that the memory 130 may also store respective locations associated with the first communication device 108 and the names 132, and respective role data associated with the names.

Regardless, any combination of non-phonetic role data may be used to select the particular name 132 at the block 304. For example, the caller 112 may have previously communicated with two callees 114 associated with similar names 132, and hence an image and/or audio signature of the caller 112 may be stored in two sets of historical non-phonetic data 134: in these examples, location data and/or role data may be used to select the particular name 132 at the block 304.

However, the historical non-phonetic data 134 may also store and/or indicate calling patterns of the caller 112, indicated, for example, by images and/or audio signatures of the caller 112 stored in the historical non-phonetic data 134, which may also be time-stamped with a date and/or time that the images and/or audio signatures were received and/or generated, and such time-stamps may indicate calling patterns of the caller 112. For example, while the caller 112 may have communicated with two callees 114 with similar names in the past, the caller 112 may have communicated with a first callee 114, of the two callees 114, more than a second callee 114, and hence a name 132 of the first callee 114 that is more frequently communicated with may be selected as the particular name 132 at the block 304.

Alternatively, and/or in addition, the calling patterns of the caller 112 may indicate that the caller 112 may have communicated with a first callee 114 more frequently, but has communicated with the second callee 114 more recently than the first callee 114, and hence a name 132 of the second callee 114 that was most recently communicated with may be selected as the particular name 132 at the block 304.

Alternatively, and/or in addition, the calling patterns of the caller 112 may indicate that the caller 112 tends to communicate with a first callee 114 in the morning (e.g., between 8 am and noon), but communicates with a second callee 114 in the afternoon (e.g., between noon and 5 pm), and hence a name 132 of the callee 114 that is selected as the particular name 132 at the block 304 may depend on a current time. For example, when a current time is between 8 am and noon, the first callee 114 may be selected as the particular name 132 at the block 304: however, when a current time is between noon and 5 pm, the second callee 114 may be selected as the particular name 132 at the block 304.

Hence, the machine learning algorithm 106 may be trained to select the particular name 132 in any suitable manner using the phonetic data to determine which names 132 at the memory 130 correspond to the phonetic data, and using the non-phonetic data to determine which of the names 132 at the memory 130 that correspond to the phonetic data are indicated by the non-phonetic data.

Hence, for example, when the names 132 at the memory 130 include "Portia Cline" and "Porsha Klyne", both of which are indicated by the phonetic data "PRXKLN", non-phonetic data may be used to select one of the names 132 "Portia Cline" and "Porsha Klyne" as the particular name 132. For example, an image of the caller 112 may match an image of a previous caller stored in historical non-phonetic data 134 associated with the name 132 of "Portia Cline", and hence the name 132 of "Portia Cline" may be selected as the particular name 132 at the block 304.

At a block 306, the controller 218, and/or the computing device 102, initiates a communication between the first communication device 108, and a second communication device 110 associated with the particular name 132. In some examples, the communication may comprise a call between the first communication device 108 and the second communication device 110 associated with the particular name 132, while in other examples, the communication may be initiated by way of the computing device 102 providing a message, a notification, and the like to the second communication device 110.

Hence, such a communication may comprise a call (e.g. a voice call), a message, a notification, and/or any other suitable communication.

In examples where the communication comprises a call, the controller 218, and/or the computing device 102 may communicatively couple and/or connect the first communication device 108 and the second communication device 110 associated with the particular name 132 using, for example, the network address 136 of the second communication device 110 associated with the particular name 132 stored at the memory 130. In some examples, the call may be connected via the computing device 102 while, in other examples, the controller 218, and/or the computing device 102 may control network infrastructure to initiate the call, and a connection between the first communication device 108 and the second communication device 110 may occur via such network infrastructure.

However, in other examples, at the block 306, the controller 218, and/or the computing device 102 may provide a message and/or notification to the second communication device 110 comprising text such as "You have a visitor". In some examples, a callee 114, associated with the second communication device 110 associated with the particular name 132, may view and/or hear the message and/or notification, and the like, at an output devices of the second communication device 110, and operate the second communication device 110 to reply with a suitable message, and the like, and/or initiate a call between the second communication device 110 and the first communication device 108, and/or access video and/or images from the video camera 118 of the first communication device 108, and/or operate the second communication device 110 in any suitable manner to identify and/or communicate with the caller 112 (e.g. via the first communication device 108). However, such a return communication may be optional: rather, the callee 114 may operate the second communication device 110 and/or any suitable device, to operate hardware (e.g. such as a gate, a door, and the like, amongst other possibilities) at a location of the first communication device 108 to let the caller 112 into a building, and the like, at which the first communication device 108 is located.

At a block 308, the controller 218, and/or the computing device 102, receives, from one or more of the first communication device 108 and the second communication device 110, feedback indicating whether the match of the particular name 132 and the target name 132 is positive or negative.

For example, as has already been described, the controller 218 and/or the computing device 102 may request the feedback from one or more of the first communication device 108 and the second communication device 110, and the feedback may be in a binary format indicating that "YES" (e.g., or "1", and the like) the match of the particular name 132 and the target name is positive, or "NO" (e.g., or "0", and the like) the match of the particular name and the target name is negative.

At a block 310, the controller 218, and/or the computing device 102, trains the one or more machine learning algorithms 106 using the feedback.

For example, at the block 304. the controller 218, and/or the computing device 102 may operate the machine learning algorithm 106 in a normal mode at the block 304 in which the machine learning algorithm 106 receives input and generates output. However, at the block 310, the controller 218, and/or the computing device 102 may operate the machine learning algorithm 106 in a training mode and/or learning mode in which the machine learning algorithm 106 receives training data labelled with the feedback received at the block 308.

For example, training the one or more machine learning algorithms 106 at the block 310 may comprise: assembling the input (e.g., the phonetic data and the non-phonetic data) and the particular name 132 (e.g., selected at the block 304) into training data; and labelling the training data using the feedback as positive training data or negative training data. For example, when the feedback is "YES", or "1", and the like, the training data may be labelled as positive training data. Conversely, when the feedback is "NO", or "0", and the like, the training data may be labelled as negative training data.

Indeed, in general, it is understood that the feedback may correct an aforementioned score output by the machine learning algorithm 106.

It is further understood that training the one or more machine learning algorithms 106 at the block 310 may result in the aforementioned score output by the machine learning algorithm 106 increasing over time towards "1", when later selecting a particular name 132 in another implementation of the method 300. Put another way, the training the one or more machine learning algorithms 106 at the block 310 may result in the one or more machine learning algorithms 106, and/or the computing device 102, operating more efficiently.

It is further understood that the input e.g., the phonetic data and the non-phonetic data) may comprise training input, and the particular name 132 (e.g., selected at the block 304) may comprise training output.

Hence, training the one or more machine learning algorithms 106 may comprise: using the input as training input; using the particular name 132 as training output; and using the feedback to label one or more of the training input and the training output as positive training data or negative training data. In some examples, the training input may further comprise the names 132 and the historical non-phonetic data 134.

However, in some examples, the controller 218, and/or the computing device 102 may fail to receive the feedback. For example, while the feedback may be requested from one or more of the first communication device 108 and the second communication device 110, neither the first communication device 108, nor the second communication device 110, may respond to the request.

In some of these examples, the controller 218, and/or the computing device 102 may fail to receive the feedback. For example, the controller 218, and/or the computing device 102 may determine that the feedback has not been received when not received within a given time period that may begin when the communication (e.g., of the block 306) is connected and/or when the feedback is requested.

In such examples, the method 300 may further comprise, the controller 218, and/or the computing device 102: assembling the input and the particular name 132 into training data (e.g., and also the names 132 and the historical non-phonetic data 134): failing to receive the feedback; and, in response: labelling the training data as positive training data or negative training data using one or more of:

- Metadata associated with the communication. Such metadata may include, but is not limited to, a length of the call of the communication. For example, when the communication comprises a call is greater than (or equal to) a threshold time (e.g., 5 seconds, 10 seconds, amongst other possibilities), the controller 218, and/or the computing device 102 may determine that the particular name 132 was successfully selected and the feedback may be set to "YES" and/or "1", and the like. Conversely, when the communication comprises a call is less than the threshold time, the controller 218, and/or the computing device 102 may determine that the particular name 132 was not successfully selected and the feedback may be set to "NO" and/or "0", and the like. Such examples assume that a successful selection of the particular name 132 results in longer calls (e.g., of greater than the threshold time). Such metadata may further include, but is not limited to audio associated with the call, video associated with the call, data indicative of operation of hardware at a location of the first communication device 108 that occurs in response to the communication (e.g. whether a call or a message or a notification), and the like, which are next described.
- Audio associated with the communication. For example, the audio associated with the communication, such as a conversation between the caller 112 and the callee 114 on a call of the communication, may indicate whether the particular name 132 was successfully or unsuccessfully selected. In a particular example, one or more of the caller 112 and the callee 114 may say "Great! Glad you are here!", "Glad we could connect", "Hi, I've been expecting you", and the like, which may indicate a successful selection of the particular name 132. Conversely, one or more of the caller 112 and the callee 114 may say "Wrong Number", "I am not the person you're looking for" and the like, which may indicate an unsuccessful selection of the particular name 132. In these examples, the controller 218 and/or the computing device 102 may implement a speech-to-text engine (e.g., as a component of the application 222) and a natural language analysis engine, and the like, configured to determine whether audio of a call of the communication indicates whether the particular name 132 was successfully or unsuccessfully selected: such analysis may occur via any suitable machine language algorithm. Regardless, the controller 218, and/or the computing device 102 may determine that the particular name 132 was successfully selected when certain natural language phrases, indicating a successful selection of the particular name 132, are detected in the audio and the feedback may be set to "YES" and/or "1", and the like. Conversely, the controller 218, and/or the computing device 102 may determine that the particular name 132 was unsuccessfully selected when certain natural language phrases, indicating an unsuccessful selection of the particular name 132, are detected in the audio, and the feedback may be set to "NO" and/or "0", and the like.
- Video associated with the communication. For example, the video associated with the communication, such as video from the first communication device 108 and/or the second communication device 110, may indicate body language, and the like of the caller 112 and/or the callee 114, which may indicate whether the particular name 132 was successfully or unsuccessfully selected. In a particular example, the video may show one or more of the caller 112 and the callee 114 appearing happy or unhappy, which may respectively indicate a successful or unsuccessful selection of the particular name 132. Such video may be acquired whether the communication is a call or another type of communication. In these examples, the controller 218 and/or the computing device 102 may implement a video analysis engine, and the like, configured to determine whether video indicates whether the particular name 132 was successfully or unsuccessfully selected: such analysis may occur via any suitable machine language algorithm. Regardless, the controller 218, and/or the computing device 102 may determine that the particular name 132 was successfully selected when certain actions, indicating a successful selection of the particular name 132, are detected in the video, and the and the feedback may be set to "YES" and/or "1", and the like. Conversely, the controller 218, and/or the computing device 102 may determine that the particular name 132 was unsuccessfully selected when certain actions, indicating an unsuccessful selection of the particular name 132, are detected in the video, and the feedback may be set to "NO" and/or "0", and the like.
- Data indicative of operation of hardware at a location of the first communication device 108 that occurs in response to the communication. For example, while not depicted, the first communication device 108 (e.g., as an intercom) may be located at a door of a building, which may be operated, via the second communication device 110 and/or the computing device 102, and/or the first communication device 108 (and/or any other suitable device), to unlock, for example to let the caller 112 into the building. Such unlocking may occur as the caller 112 has asked the callee 114 to enter the building (e.g. via a call and/or a message and/or a notification of the communication), and the callee 114 may initiate the unlocking of the door to let the caller 112 into the building. Such unlocking may hence indicate that the particular name 132 was successfully selected. Regardless, the controller 218, and/or the computing device 102 may determine that the particular name 132 was successfully selected when the door is unlocked (e.g., within a given time period (e.g., 5 seconds, 10 seconds, amongst other possibilities, starting from the beginning of the communication being initiated (e.g. including but not limited to a call thereof), or the end of the communication and/or the call thereof, and the like), and the like, and the feedback may be set to "YES" and/or "1", and the like. Conversely, the controller 218, and/or the computing device 102 may determine that the particular name 132 was unsuccessfully selected when the door is not unlocked within a given time period (e.g., 5 seconds, 10 seconds, amongst other possibilities) starting from the beginning of the communication and/or the call thereof, or the end of the communication and/or the call thereof, and the like, and the feedback may be set to "NO" and/or "0", and the like. However, operation of any suitable hardware at a location of the first communication device 108 that occurs in response to the communication may be used to determine such feedback, including, but not limited to, operation of certain components of the first communication device 108 itself: for example, in response to the communication, the video camera 118 may be operated and such video may be provided to the second communication device 110 so that the callee 114 may better communicate with a caller 112 that the callee 114 recognizes (an such operation may occur via the callee 114 interacting with the second communication device 110 to request such video via the computing device 102). Hence references to hardware at a location of the first communication device 108 may be represented herein at least by the first communication device 108 itself. Any analysis of such hardware, and/or commands provided to such hardware to operate such hardware, may occur via any suitable machine language algorithm.

However, any suitable data, and/or combination thereof, may be used to label the training data as positive training data or negative training data.

In some of these examples, as has already been discussed, such labelling of the training data may occur via a machine learning algorithm, such as a labelling machine learning algorithm, using one or more of the metadata, the audio, the video, and the data, indicative of operation of hardware at a location of the first communication device 108, as respective input to the labelling machine learning algorithm. Such a labelling machine learning algorithm may receive one or more of the metadata, the audio, the video, and the data, indicative of operation of hardware at a location of the first communication device 108, as respective input, and output a "1" or a "0" to label the training data. Alternatively, such a labelling machine learning algorithm may output a value between "0" or a "1", which may be used to label the training data.

Figure 4:
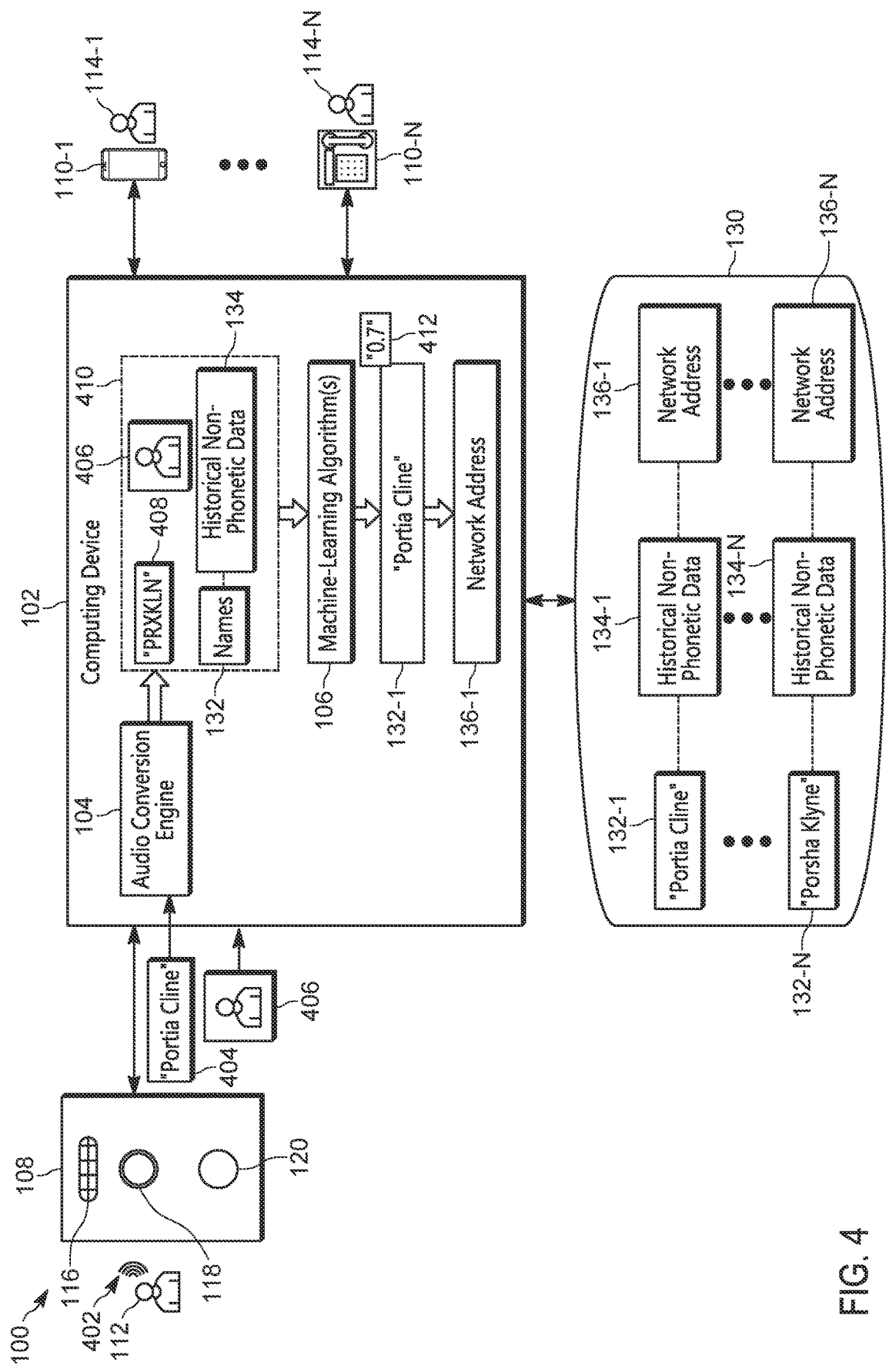
FIG. 4 depicts the system of FIG. 1 implementing aspects of a method to initiate a communication between communication devices based on audio input, in accordance with some examples.
Figure 5:
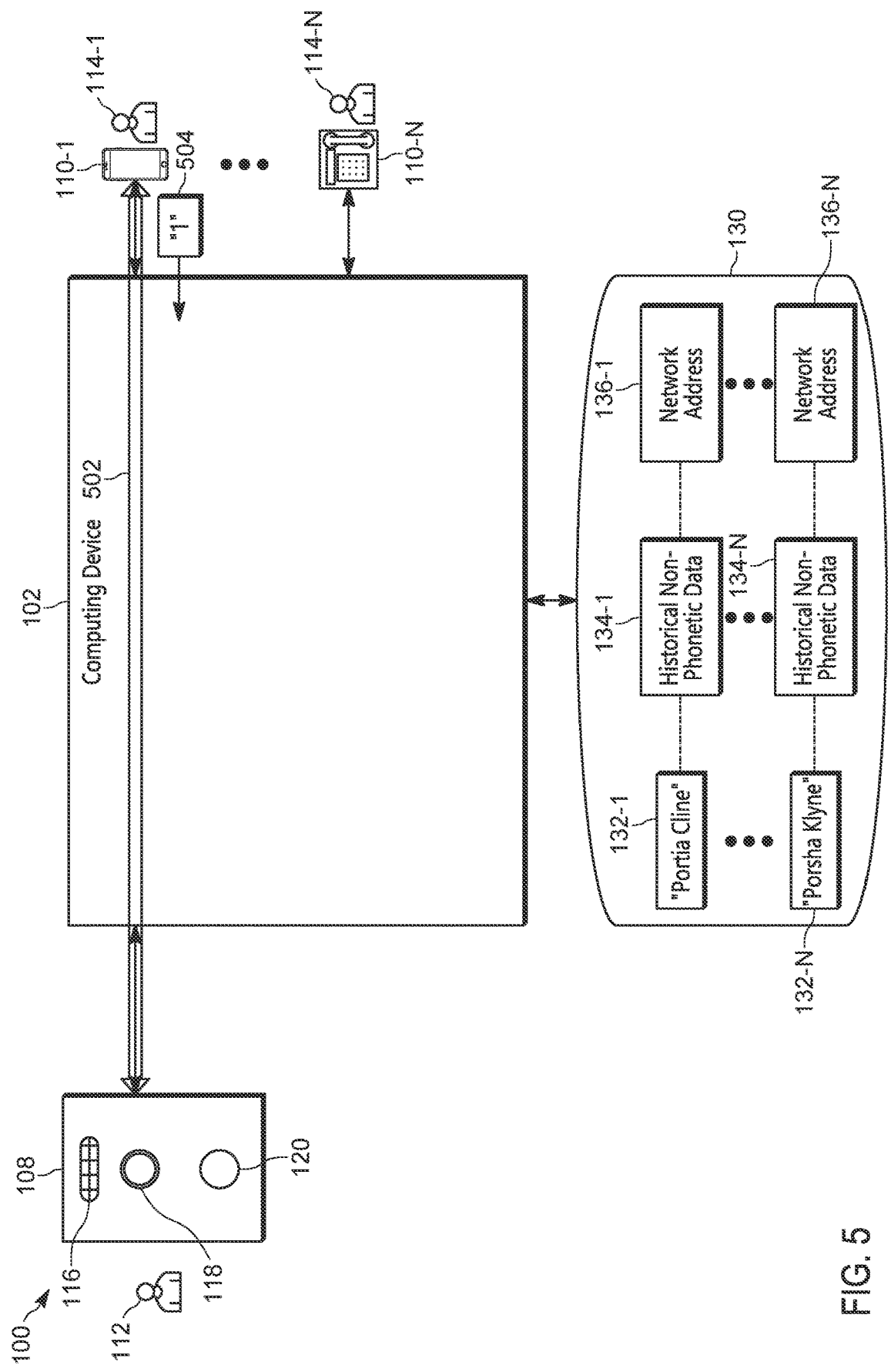
FIG. 5 depicts the system of FIG. 1 continuing to implement aspects of a method to initiate a communication between communication devices based on audio input, in accordance with some examples.
Figure 6:
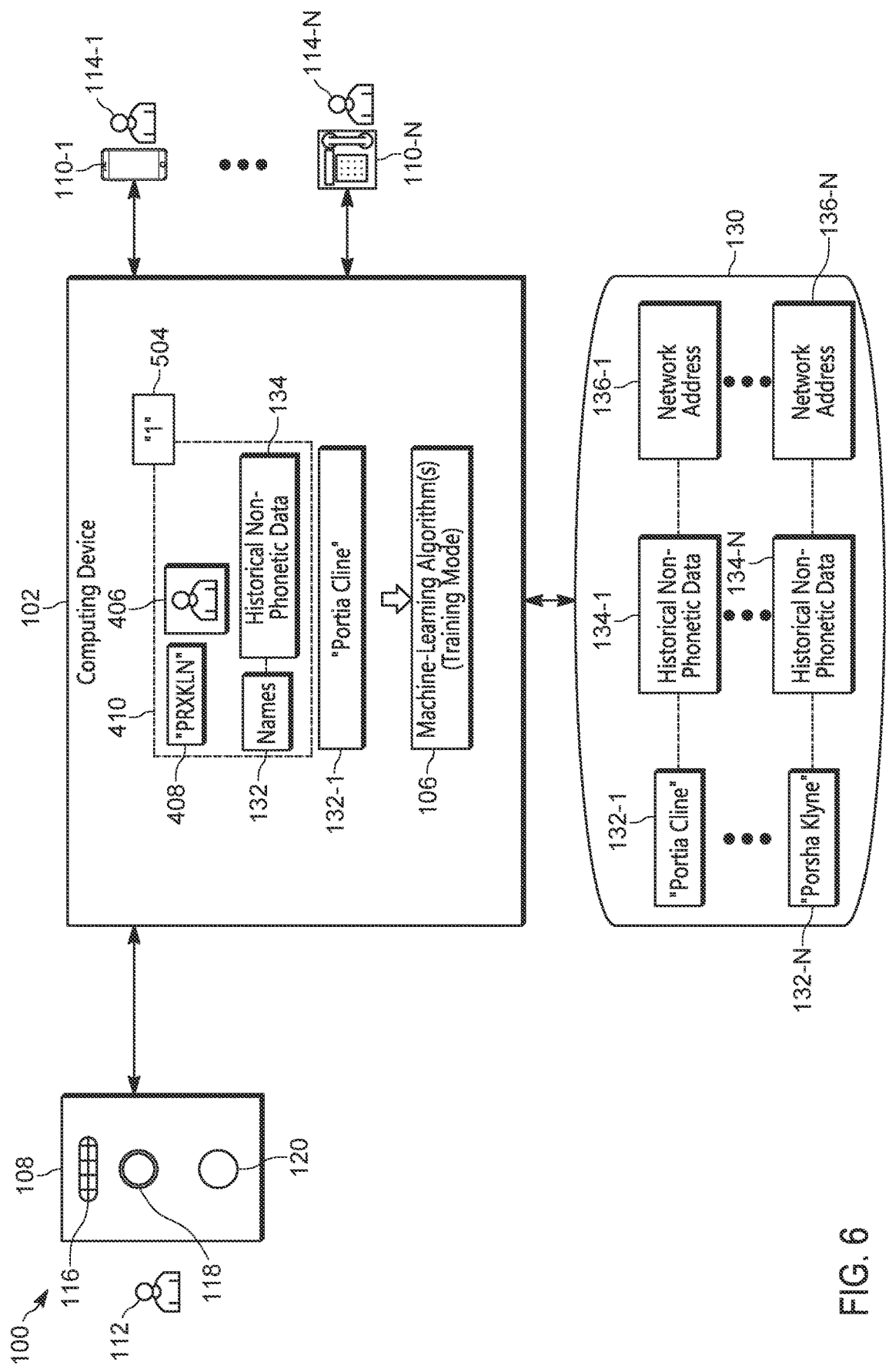
FIG. 6 depicts the system of FIG. 1 continuing to implement aspects of a method to initiate a communication between communication devices based on audio input, in accordance with some examples.

Attention is next directed to FIG. 4, FIG. 5, and FIG. 6, which depict aspects of the method 300. FIG. 4, FIG. 5, and FIG. 6 are similar to FIG. 1, with like components having like numbers. Furthermore, while for simplicity not all components of the system 100 are depicted in all of FIG. 4, FIG. 5, and FIG. 6, such components are nonetheless understood to be present. In the examples of FIG. 4, FIG. 5, and FIG. 6, the first name 132-1 is understood to comprise "Portia Cline", which is understood to be the name of the callee 114-1: similarly, the N$^{th}$ name 132-N is understood to comprise "Porsha Klyne", which is understood to be the name of the callee 114-N.

Attention is next directed to FIG. 4, which depicts the caller 112 speaking into the microphone 116 of the first communication device 108, as represented by sound 402, which is converted to audio input 404 (e.g., data representing the sound 402), which is provided to the computing device 102. As depicted, the first communication device 108 further acquires an image 406 of the caller 112, which is also provided to the computing device 102 as non-phonetic data associated with the audio input 404.

The computing device 102 receives the audio input 404 and converts (e.g., at the block 302 of the method 300) the audio input 404 to phonetic data 408 by inputting the audio input 404 to the audio conversion engine 104, which outputs the phonetic data 408. For example, as depicted, the audio input 404 comprises "Portia Cline", and the phonetic data 408 comprises "PRXKLN". Hence, in these examples, the target name of the audio input 404 is understood to comprise "Portia Cline".

The computing device 102 assembles the phonetic data 408 and the image 406 into input 410 to the machine learning algorithm 106. As depicted, the input 410 further includes the names 132 and associated historical non-phonetic data 134 (e.g., non-phonetic data associated with at least one of the plurality of names 132). The input 410 is input to the machine learning algorithm 106, which selects (e.g., at the block 304 of the method 300) the particular name 132-1 of "Portia Cline" as matching the target name based on the phonetic data 408, the image 406, names 132 and the historical non-phonetic data 134. For example, while the phonetic data 408 of "PRXKLN" may correspond to both names 132-1, 132-N of "Portia Cline" and "Porsha Klyne", respectively, a previous image of the caller 112 may be stored in the historical non-phonetic data 134-1 associated with the particular name 132-1 of "Portia Cline".

As depicted, the particular name 132-1 of "Portia Cline" is output by the machine learning algorithm 106 with a score 412 of "0.7" indicating an estimated accuracy of the match of the particular name 132-1 of "Portia Cline", and the target name of "Portia Cline".

As depicted, as the particular name 132-1 of "Portia Cline" is selected, the computing device 102 may retrieve the associated network address 136-1 of the second communication device 110-1 operated by the callee 112-1 having the name 132-1 of "Portia Cline".

As depicted in FIG. 5, which follows in time from FIG. 4, the computing device 102 initiates (e.g., at the block 306 of the method 300), a communication 502 between the first communication device 108 and the second communication device 110-1 having the associated network address 136-1 (and operated by the callee 112-1 having the name 132-1 of "Portia Cline"). While the communication 502 is depicted as occurring via the computing device 102, the communication 502 may be initiated and/or may occur in any suitable manner. Furthermore, while it is understood that the communication 502 is depicted as a call between the first communication device 108 and the second communication device 110-1 having the associated network address 136-1, the communication 502 may comprise any suitable communication.

Also depicted, in FIG. 5, the computing device 102 receives (e.g., at the block 308 of the method 300) feedback 504 of "1" from the second communication device 110-1 indicating that the match of the particular name 132-1 of "Portia Cline", and the target name of "Portia Cline, is positive.

As depicted in FIG. 6, which follows in time from FIG. 5, the computing device places the machine learning algorithm 106 into a training mode and trains (e.g., at the block 310 of the method 300) the machine learning algorithm 106 using the feedback 504.

For example, the input 410 is used as training input, labelled with the feedback 504, rather than the score 412, and the particular name 132-1 of "Portia Cline" is used as training output, which may also be labelled with the feedback 504. Together, the training input and the training output may comprise training data, labelled with the feedback 504. Put another way, the score 412 is corrected from "0.7" to "1" using the feedback 504, and the machine learning algorithm 106 is trained to better match a particular name 132 to a target name.

It is further understood that if the feedback 504 is "0", indicating that the match of the particular name 132-1 of "Portia Cline" and the target name is negative, the score 412 may be corrected to "0", and the training data labelled accordingly.

Indeed, the training of the machine learning algorithm 106 may occur via a machine learning algorithm training feedback loop in which input is used to generate output associated with scores, and the scores are corrected using the feedback, and the input and the output is used to train the machine learning algorithm with the feedback rather than the scores.

As should be apparent from this detailed description above, the operations and functions of electronic computing devices described herein are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, train a machine learning algorithm, and the like).

In the foregoing specification, specific examples have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element (s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together). Similarly the terms "at least one of" and "one or more of", without a more limiting modifier such as "only one of", and when applied herein to two or more subsequently defined options such as "at least one of A or B", or "one or more of A or B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising: converting, via a computing device, an audio input from a first communication device, into phonetic data corresponding to a target name from the audio input, wherein the first communication device is at a fixed location, wherein the audio input is received at the first communication device from a caller located at the first communication device, and wherein the target name identifies a callee;
   selecting, via the computing device, using one or more machine learning algorithms, from a plurality of names that potentially match the target name, a particular name as a match to the target name, using as input to the one or more machine learning algorithms:
   the phonetic data; and non-phonetic data associated with one or more of the audio input, and at least one of the plurality of names, wherein the particular name comprises a name of the callee, and wherein the non-phonetic data comprises one or more of:
   an image of the caller at the first communication device as acquired by a camera at the first communication device;
   an audio signature of the caller based on the audio input received from the first communication device;
   the fixed location of the first communication device; and
   a role of the callee identified in the audio data,
   wherein the particular name is at least partially selected based on one or more of:
   a match between the image of the caller and an historical image of the caller stored in association with the callee;
   a respective match between the audio signature of the caller and an historical audio signature of the caller stored in association with the callee;
   the fixed location being same as, or similar to, a respective location associated with the callee; and
   the role being same as, or similar to, a respective role associated with the callee;
   initiating, via the computing device, a communication between the first communication device, and a second communication device associated with the callee identified by the particular name; receiving, via the computing device, from one or more of the first communication device and the second communication device, feedback indicating whether the match of the particular name and the target name is positive or negative; and training, via the computing device, the one or more machine learning algorithms using the feedback.

2. The method of claim 1, wherein the phonetic data comprises a textual representation of the target name.

3. The method of claim 1, wherein training the one or more machine learning algorithms comprises:
   assembling the input and the particular name into training data; and
   labelling the training data using the feedback as positive training data or negative training data.

4. The method of claim 1, wherein training the one or more machine learning algorithms comprises:
   using the input as training input;
   using the particular name as training output; and
   using the feedback to label one or more of the training input and the training output as positive training data or negative training data.

5. The method of claim 1, further comprising requesting the feedback from one or more of the first communication device and the second communication device.

6. The method of claim 1, further comprising:
   assembling the input and the particular name into training data;

failing to receive the feedback; and, in response:
  labelling the training data as positive training data or negative training data using one or more of:
  metadata associated with the communication;
  audio associated with the communication;
  video associated with the communication; and
  data indicative of operation of hardware at a location of the first communication device that occurs in response to the communication.

7. The method of claim 6, wherein labelling the training data occurs via a labelling machine learning algorithm using one or more of the metadata, the audio, the video, and the data as respective input to the labelling machine learning algorithm.

8. The method of claim 1, wherein the first communication device comprises an intercom at the fixed location.

9. A computing device comprising: a controller; and a computer-readable storage medium having stored thereon program instructions that, when executed by the controller, cause the computing device to perform a set of operations comprising: converting an audio input from a first communication device, into phonetic data corresponding to a target name from the audio input, wherein the first communication device is at a fixed location, wherein the audio input is received at the first communication device from a caller located at the first communication device, and wherein the target name identifies a callee;
  selecting, using one or more machine learning algorithms, from a plurality of names that potentially match the target name, a particular name as a match to the target name, using as input to the one or more machine learning algorithms:
  the phonetic data; and non-phonetic data associated with one or more of the audio input, and at least one of the plurality of names, wherein the particular name comprises a name of the callee, and wherein the non-phonetic data comprises one or more of: an image of the caller at the first communication device as acquired by a camera at the first communication device;
  an audio signature of the caller based on the audio input received from the first communication device;
  the fixed location of the first communication device; and
  a role of the callee identified in the audio data,
  wherein the particular name is at least partially selected based on one or more of:
  a match between the image of the caller and an historical image of the caller stored in association with the callee;
  a respective match between the audio signature of the caller and an historical audio signature of the caller stored in association with the callee;
  the fixed location being same as, or similar to, a respective location associated with the callee; and
  the role being same as, or similar to, a respective role associated with the callee;
  initiating a communication between the first communication device, and a second communication device associated with the callee identified by the particular name;
  receiving, from one or more of the first communication device and the second communication device, feedback indicating whether the match of the particular name and the target name is positive or negative; and training the one or more machine learning algorithms using the feedback.

10. The computing device of claim 9, wherein the phonetic data comprises a textual representation of the target name.

11. The computing device of claim 9, wherein the set of operations further comprises training the one or more machine learning algorithms by:
  assembling the input and the particular name into training data; and
  labelling the training data using the feedback as positive training data or negative training data.

12. The computing device of claim 9, wherein the set of operations further comprises training the one or more machine learning algorithms by:
  using the input as training input;
  using the particular name as training output; and
  using the feedback to label one or more of the training input and the training output as positive training data or negative training data.

13. The computing device of claim 9, wherein the set of operations further comprises requesting the feedback from one or more of the first communication device and the second communication device.

14. The computing device of claim 9, wherein the set of operations further comprises:
  assembling the input and the particular name into training data;
  failing to receive the feedback; and, in response:
    labelling the training data as positive training data or negative training data using one or more of:
    metadata associated with the communication;
    audio associated with the communication;
    video associated with the communication; and
    data indicative of operation of hardware at a location of the first communication device that occurs in response to the communication.

15. The computing device of claim 14, wherein the set of operations further comprises labelling the training data occurs via a labelling machine learning algorithm using one or more of the metadata, the audio, the video, and the data as respective input to the labelling machine learning algorithm.

16. The computing device of claim 9, wherein the first communication device comprises an intercom at the fixed location.

* * * * *